(12) United States Patent
Sakamoto et al.

(10) Patent No.: US 6,179,372 B1
(45) Date of Patent: Jan. 30, 2001

(54) FRONT PORTION STRUCTURE OF AN AUTOMOBILE VEHICLE BODY

(75) Inventors: Sunao Sakamoto; Keiichi Fukushima, both of Toyota (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/396,738

(22) Filed: Sep. 15, 1999

(30) Foreign Application Priority Data

Sep. 16, 1998 (JP) .................................................. 10-261941
Apr. 26, 1999 (JP) .................................................. 11-118547

(51) Int. Cl.$^7$ ...................................................... B60J 7/00
(52) U.S. Cl. ...................... 296/194; 296/203.02; 296/70; 296/72; 280/779
(58) Field of Search ........................... 296/203.02, 194, 296/70, 72; 280/779

(56) References Cited

U.S. PATENT DOCUMENTS

| 2,638,356 | * | 5/1953 | Butterfield et al. | 296/194 |
|---|---|---|---|---|
| 4,391,465 | * | 7/1983 | Piano | 296/194 |
| 4,469,368 | * | 9/1984 | Eger | 296/194 |
| 4,712,829 | * | 12/1987 | Hurten et al. | 296/203.02 |
| 4,900,082 | * | 2/1990 | Schwuchow et al. | 296/194 |
| 5,011,201 | * | 4/1991 | Takahashi et al. | 296/203.02 |
| 5,048,888 | * | 9/1991 | Willy et al. | 296/194 |
| 5,201,566 | * | 4/1993 | Mori | 296/203.02 |
| 5,238,286 | * | 8/1993 | Tanaka et al. | 296/70 |
| 5,282,637 | * | 2/1994 | McCreadie | 296/203.02 |
| 5,358,300 | * | 10/1994 | Gray | 296/72 |
| 5,658,041 | * | 8/1997 | Girardot et al. | 296/194 |
| 5,810,426 | * | 9/1998 | Bovellan | 296/194 |
| 5,868,426 | * | 2/1999 | Edwards et al. | 296/203.02 |
| 5,934,744 | * | 8/1999 | Jergens et al. | 296/203.02 |
| 5,943,733 | * | 8/1999 | Manwaring | 296/203.02 |

FOREIGN PATENT DOCUMENTS 10-45034   2/1998  (JP) .

* cited by examiner

Primary Examiner—Joseph D. Pape
Assistant Examiner—Kiran Patel
(74) Attorney, Agent, or Firm—Pillsbury Madison & Sutro LLP

(57) ABSTRACT

A front portion structure of an automobile vehicle body having front side members disposed in right and left side portions of a vehicle body and extending in the longitudinal direction and an instrument panel reinforcement disposed between right and left front pillars and extending in the lateral direction. Pillar braces are connected to the front side members in the right and left side portions and the instrument panel reinforcement.

11 Claims, 6 Drawing Sheets

FRONT PORTION STRUCTURE OF AN AUTOMOBILE VEHICLE BODY

The disclosures of Japanese Patent Application Nos. HEI 10-261941 filed on Sep. 16, 1998 and HEI 11-118547 filed on Apr. 26, 1999 including the specifications, drawings and abstracts are incorporated herein by reference in their entirety.

BACKGROUND OF THE INVENTION

1. Field of the Invention

The present invention relates to a structure of the front portion of a vehicle body of an automobile, and more particularly to that of a passenger car.

2. Description of the Related Art

As shown in FIG. 6, a structure of the front portion of a vehicle body has been suggested. The structure incorporates front side members 10 disposed in the side portions of a vehicle body and extending in the longitudinal direction of the vehicle; a dash cross member 11 extending in the lateral direction of the vehicle and structured to connect the right and left front side members 10 to each other; front pillars 12 disposed to the rear of the dash cross member 11 at positions in the side portions of the vehicle; an instrument panel reinforcement 13 laterally extending and disposed between the front pillars 12 which are disposed in the right and left portions of the vehicle; and pillar braces 14 for connecting the front side members 10 and the front pillars 12 to each other. The structure of the front portion of a vehicle incorporating the pillar braces which are connected to the front side members and the front pillars has been disclosed in, for example, Japanese Patent Laid-Open No. HEI 10-45034.

When the automobile collides thereby exerting a great load F to the front side members 10 in the direction to the rear of the vehicle, the load F is, as indicated with an arrow, transmitted to the portions of the front side members 10 which are connected to the pillar braces 14. Thus, the load F is transmitted to the front pillars 12 through the pillar braces 14. On the other hand, the load F is transmitted rearwards along the front side members 10. If the amount of deformation of the front side member 10 is enlarged, the load is directly transmitted from tires 15 to the front pillars 12. As a result, deformation of the front pillar 12 is excessively increased. Thus, there arises a problem in the opening/closing performance of the front door pivotally connected to the front pillar 12.

Since only the deformation of the front pillar cannot sufficiently absorb the energy of the collision, the dash panel disposed below the instrument panel reinforcement and arranged to partition the cabin of the vehicle from the engine room has to be vertically bisectioned to increase the thickness of the lower portion. Thus, the energy of the collision is absorbed preventing deformation of the vehicle body.

Since the dash cross member 11 connects the right and left front side members 10 to each other, a portion of the rearward load F is dispersed in the lateral direction through the dash cross member 11. The instrument panel reinforcement 13 cannot disperse a portion of the rearward load F in the lateral direction because the front pillar 12 is deformed prior to transmission of the load to the instrument panel reinforcement 13.

SUMMARY OF THE INVENTION

According to the present invention, it is an object of the present invention to provide a structure of the front portion of a vehicle body of an automobile designed to use an instrument panel reinforcement disposed between right and left front pillars in order to support a steering column, an air conditioner and other instruments to prevent deformation of the front pillar in the event of a collision.

According to the present invention, it is another object of the present invention to provide a structure of the front portion of a vehicle body of an automobile which uses the instrument panel reinforcement and the dash cross member to prevent deformation of the front pillar in the event of a collision.

According to a first aspect of the present invention, there is provided a structure of the front portion of a vehicle body of an automobile including a front side member disposed in the side portion of a vehicle body and extending in the longitudinal direction of a vehicle, an instrument panel reinforcement disposed between front pillars, which are disposed in the right and left portions of the vehicle body, and extending in the lateral direction of the vehicle, and a pillar brace connected to the front side member disposed in the side portion and the instrument panel reinforcement.

When the vehicle collides exerting a load to the rearward direction of the vehicle, the load is transmitted to a portion of the front side member which is connected to the front pillar so that the load is transmitted to the front pillar through the pillar brace. On the other hand, the load is transmitted to the rear portion of the vehicle along the front side member. The load transmitted to the front pillar through the pillar brace acts to deform the front pillar in a direction toward the outside of the cabin. Since the instrument panel reinforcement is connected to the pillar brace, the load for deforming the front pillar to the outside of the cabin is, however, exerted to the instrument panel reinforcement as a tensile load. Thus, the load is dispersed in the lateral direction of the vehicle owing to the instrument panel reinforcement.

Since the pillar brace is directly connected to the instrument panel reinforcement, the load which is exerted to the front pillar through the pillar brace can be borne and dispersed by the instrument panel reinforcement. Thus, the deformation of the front pillar can be prevented and energy of the collision can be absorbed. Therefore, a necessity of vertically bisecting the dash panel and enlarging the thickness of the lower portion of the dash panel can be eliminated.

According to another aspect of the present invention, the instrument panel reinforcement is connected to the front pillar through the pillar brace. That is, the pillar brace is connected to the front pillar, while the instrument panel reinforcement is connected to the pillar brace.

The foregoing aspect enables the pillar brace connected to the front pillar to be used as brackets for the instrument panel reinforcement. Therefore, material waste caused by individual provision of the brackets, and unnecessary workload can be prevented.

The first aspect may be structured such that the front side member incorporates a front portion extending substantially straight in a side view and a bent portion bent downwards from the front portion in the side view, and the pillar braces are connected to the front side members at the rear portions of the front portions. A structure may be employed in which a first angle defined by an extension of the axial line of the front portion in the side view and the pillar brace and a second angle defined by an extension of the axial line of the front portion in the side view and the bent portion are determined such that the first angle is smaller than the second angle when the strength of a portion of the vehicle body above the axial line is higher than the strength of a portion of the vehicle body below the axial line, and the first angle is larger than the second angle when the strength of the portion of the vehicle body above the axial line is lower than the strength of the portion of the vehicle body below the axial line.

The load caused by the collision of an automobile is exerted to the portion of the front side member which is connected to the pillar brace. Then it is transmitted to the front pillar through the pillar brace. Meanwhile, the load is also transmitted rearward through the bent portion of the front side member. At this time, the load distributed according to the strength of the upper portion of the vehicle body and that of the lower portion of the vehicle body is exerted to the pillar braces and the bent portions of the front side members.

The foregoing aspect causes the load distributed in accordance with the strength of the vehicle body, that is, the load distributed such that a larger portion of the load is distributed to the portion of the vehicle body having a higher strength as compared with the portion of the vehicle body having a lower strength to substantially uniformly deform the overall vehicle body. Therefore, the extreme partial deformation of the vehicle body can be prevented.

The foregoing aspect can be applied to both of the right and left structures of the front portion of a vehicle body. The foregoing aspect may incorporate a dash cross member disposed between the right and left front side members and extending in the lateral direction. The pillar braces may be connected to the dash cross member in each of the side portions of the vehicle.

According to a second aspect of the present invention, there is provided a structure of the front portion of a vehicle body of an automobile including front side members disposed in the right and left side portions of a vehicle body and extending in the longitudinal direction of a vehicle, an instrument panel reinforcement disposed between front pillars, which are disposed in the right and left portions of the vehicle body, and extending in the lateral direction of the vehicle, and pillar braces connected to said front side members disposed in the side portions and said instrument panel reinforcement.

If an automobile collision causes the load directed rearward to be exerted to the front side members, the load is transmitted to portions of the front side members which are connected to the dash cross member. A portion of the load is transmitted to the dash cross member. A residual portion of the load is transmitted to portions connected to the pillar braces. On the other hand, the load is transmitted to the front pillars and the instrument panel reinforcement through the pillar braces. Another portion of the load is transmitted rearwards along the front side members. Thus, the load is dispersed.

The foregoing aspect has the structure in which the pillar braces are directly connected to the dash cross member and the instrument panel reinforcement. Therefore, the load transmitted from the front side members can be borne by the dash cross member and the instrument panel reinforcement, thus dispersing the load. As a result, deformation of the front pillars can be further prevented effectively.

The second aspect may be structured such that each of the front side members incorporates a front portion extending substantially straight in a side view and a bent portion bent downwards from the front portion in the side view, the dash cross member is connected to the rear end of the front portion and the pillar braces are connected to the dash cross member at the rear end of the front portion.

According to the foregoing aspect, the load is transmitted to the dash cross member, the pillar braces and the bent portions at substantially the rear ends of the straight front portions of the front side members. The load, thus, can reliably be dispersed.

The second aspect may be structured such that the dash cross member, the pillar brace and the instrument panel reinforcement constitute a trapezoidal truss in a plan view.

DETAILED DESCRIPTION OF THE PREFERRED EMBODIMENTS

An embodiment of a structure of the front portion of a vehicle body of an automobile according to the present invention will now be described with reference to FIGS. 1 to 5.

Figure 1:
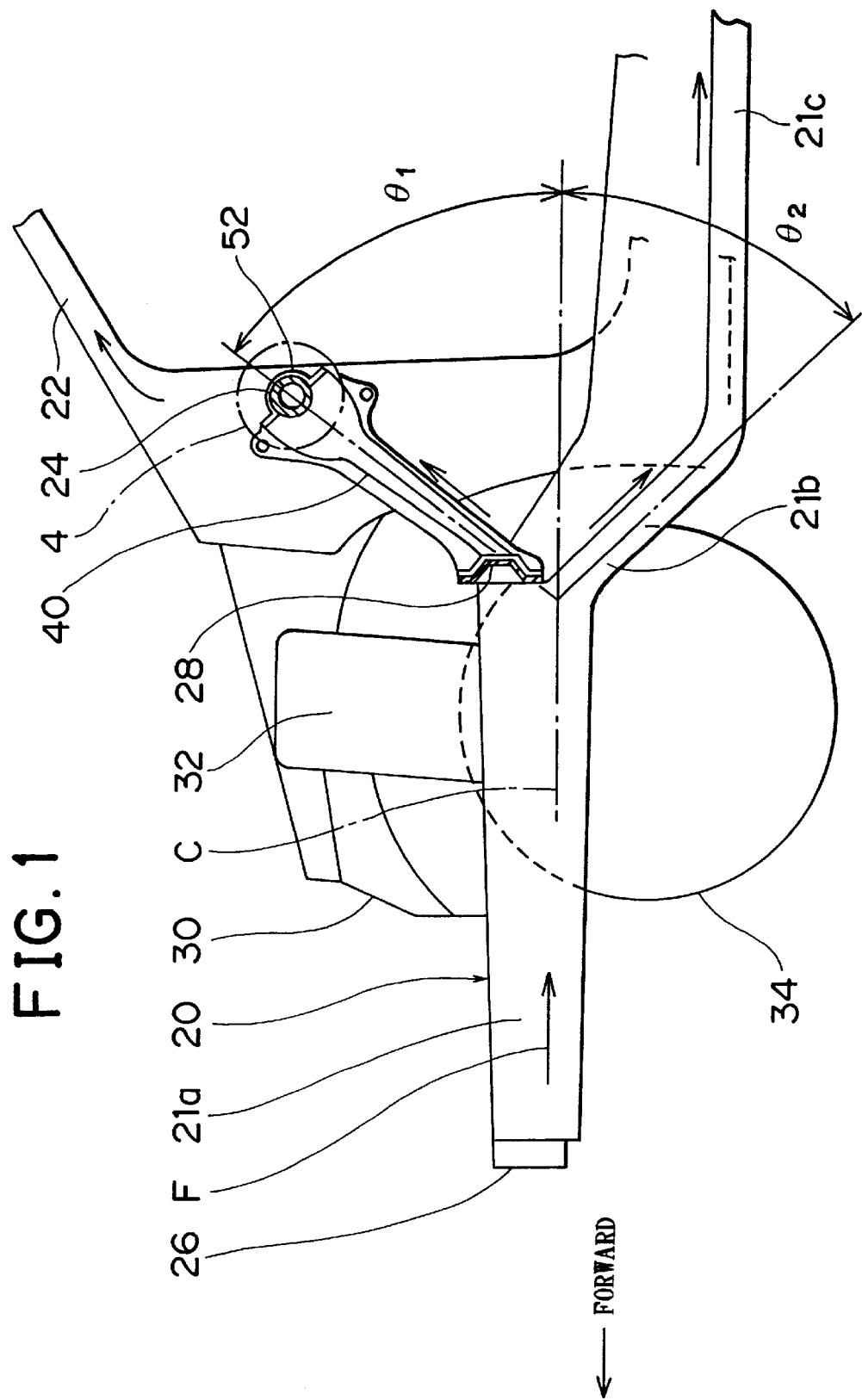
FIG. 1 is a cross sectional view showing an embodiment of a structure of the front portion of a vehicle body of an automobile according to the present invention and taken along a vertical surface including a center line extending in the longitudinal direction of the vehicle body.
Figure 2:
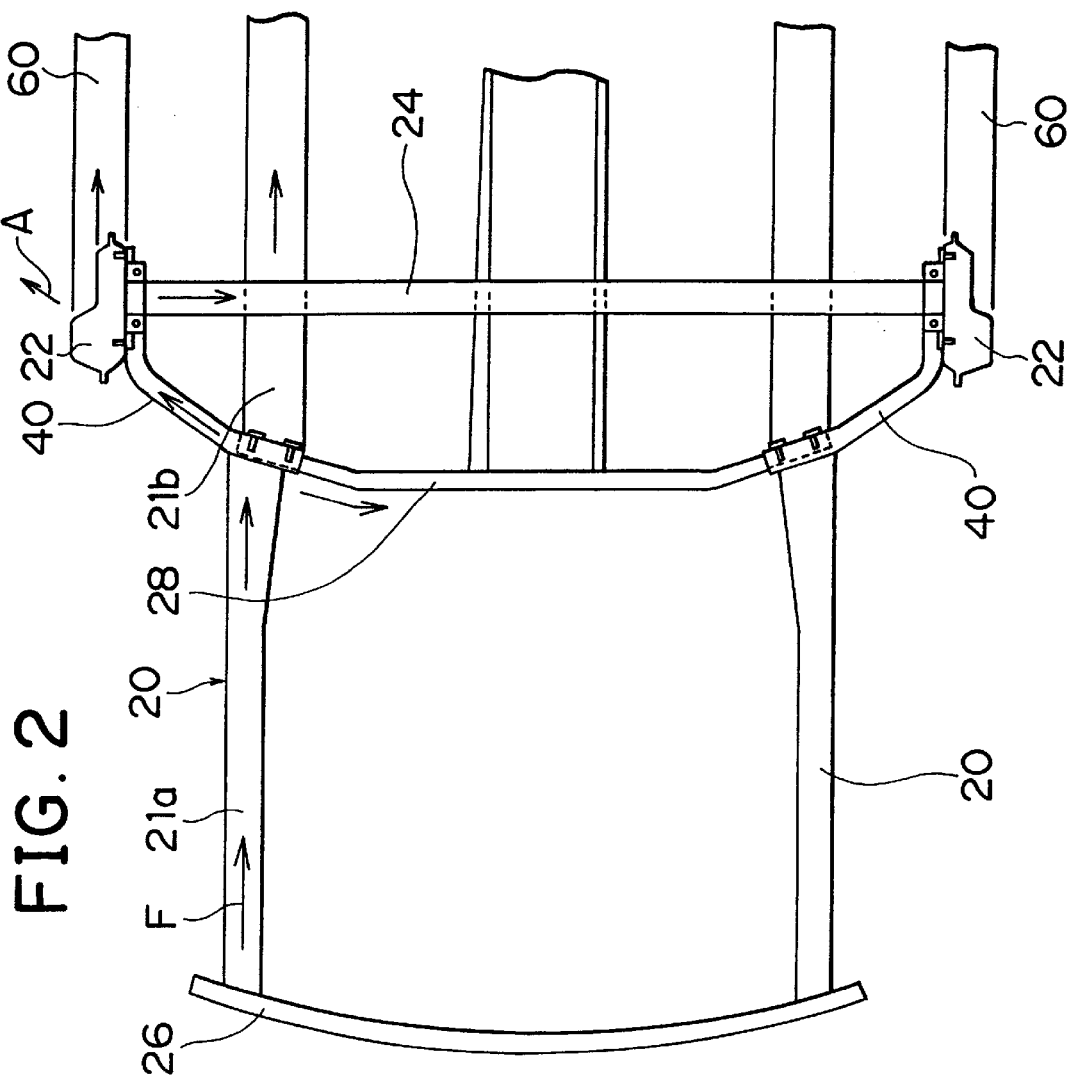
FIG. 2 is a plan view showing the embodiment of the structure of the front portion of a vehicle body of an automobile according to the present invention.

Referring to FIG. 1 which is a side view and FIG. 2 which is a plan view, the structure of the front portion of a vehicle body of an automobile according to this embodiment incorporates front side members 20 disposed in the right and left side portions of the vehicle body and extending in the longitudinal direction of the vehicle, front pillars 22 disposed in the right and left portion of the vehicle, and an instrument panel reinforcement 24 disposed between the front pillars 22 and extending in the lateral direction of the vehicle. A front-bumper reinforcement 26 is connected to front ends of the right and left front side members 20. A dash cross member 28 is connected to intermediate portions of the right and left front side members 20 and extended in the lateral direction.

Each of the front side members 20 incorporates a front portion 21a extending substantially straight in a side view, a bent portion 21b bent downwards from the front portion 21a in the side view, and a rear portion 21c further bent horizontally from the bent portion 21b and extended rearwards in the side view. The dash cross member 28 is connected to the front side members 20 as described later. A front apron 30 and a suspension tower 32 are connected to the front side member 20. Moreover, a tire 34 is supported by a strut supported by the suspension tower 32, and a suspension arm (not shown). The foregoing structure is the same as the conventional structure.

A pillar brace 40 is connected to the front side member 20 and one end of the instrument panel reinforcement 24.

Figure 3:
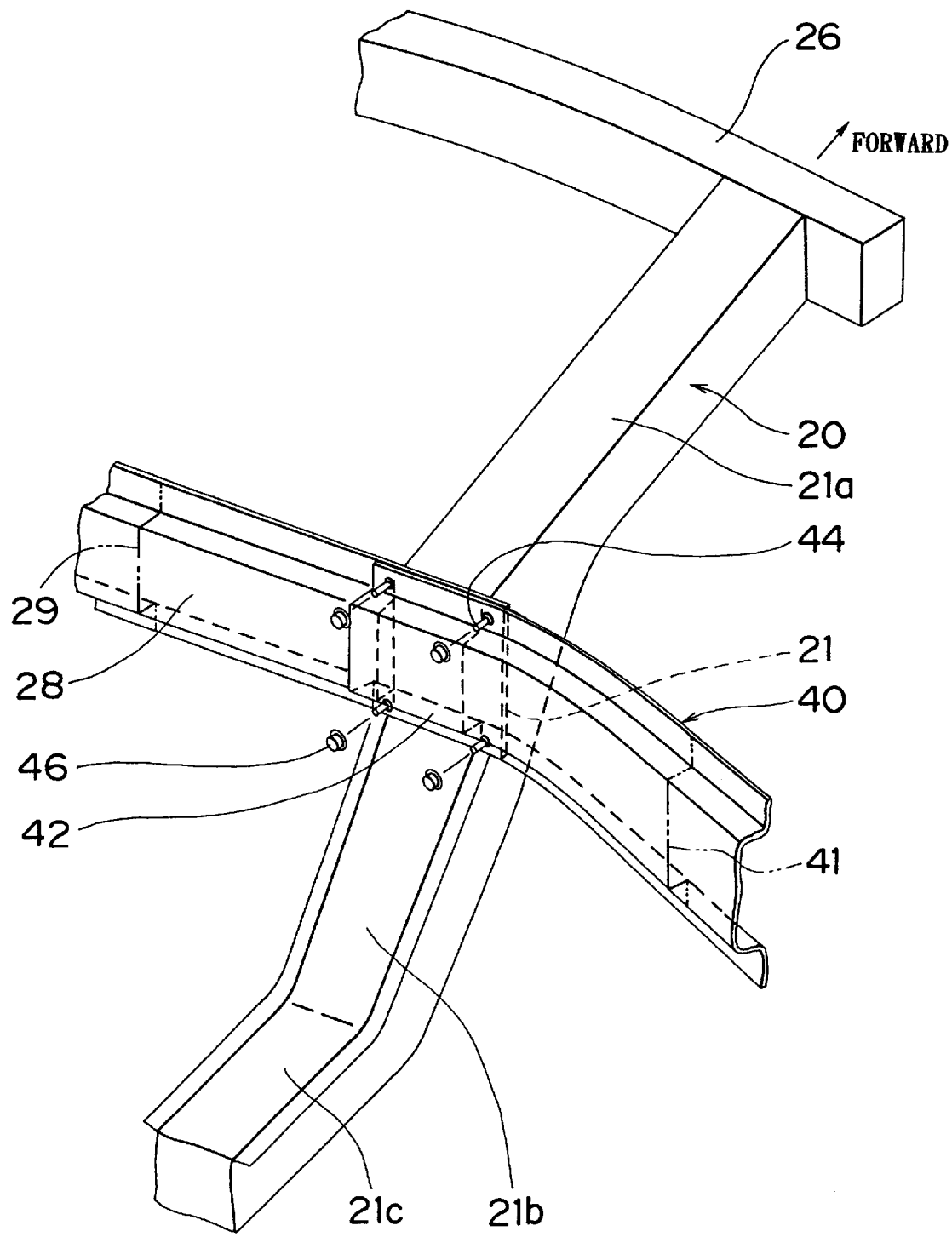
FIG. 3 is a perspective view showing portions for connecting front side members, a dash cross member and pillar braces to one another.

As shown in FIG. 3 which is a perspective view, a dash cross member 28 having a cross sectional shape indicated with an imaginary line 29, that is, a so-called hat-shape, is joined to the rear end of the front portion 21a of each of the front side members 20 by spot welding. One end 42 of the pillar brace 40 having a hat-shape cross sectional shape indicated with an imaginary line 41 is overlaid on the dash cross member 28 at a position to the rear of the rear end of each of the front portions 21a of the front side members 20. The end 42 of the pillar brace 40 has through holes into which stud bolts 44 in the front side member 20 are inserted. Moreover, nuts 46 are set to the stud bolts 44, followed by screwing and tightening of the nuts 46. Thus, the end 42 is connected to the front side member 20.

Alternatively, the dash cross member 28 may be formed to have a cross sectional shape formed into a substantially inverted U-shape so as to be joined to the side portions of the front portion 21a of the front side members 20.

Figure 4:
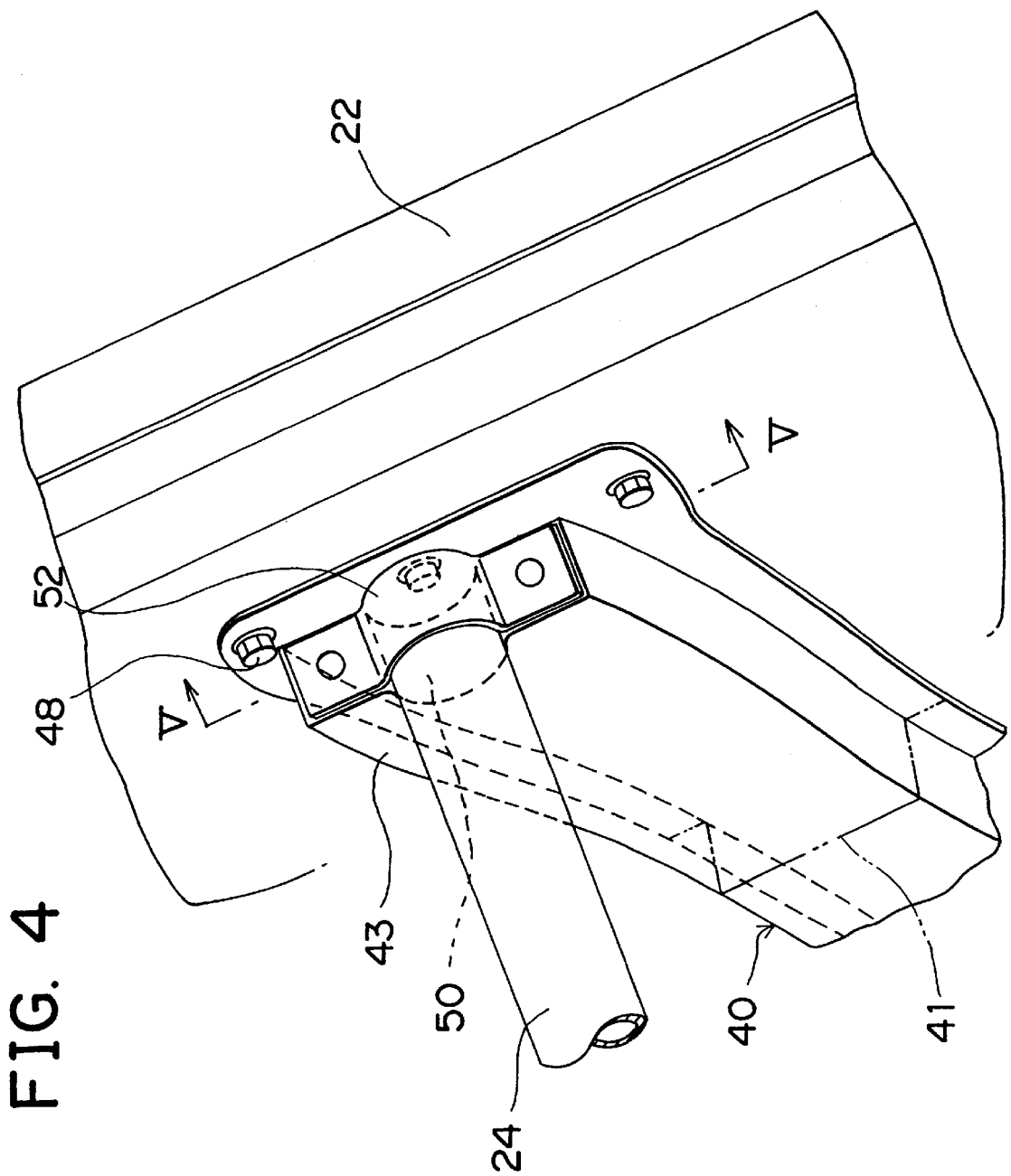
FIG. 4 is a perspective view showing portions for connecting an instrument panel reinforcement, the pillar braces and front pillars such that a portion enclosed in the circle 4 shown in FIG. 1 is enlarged.
Figure 5:
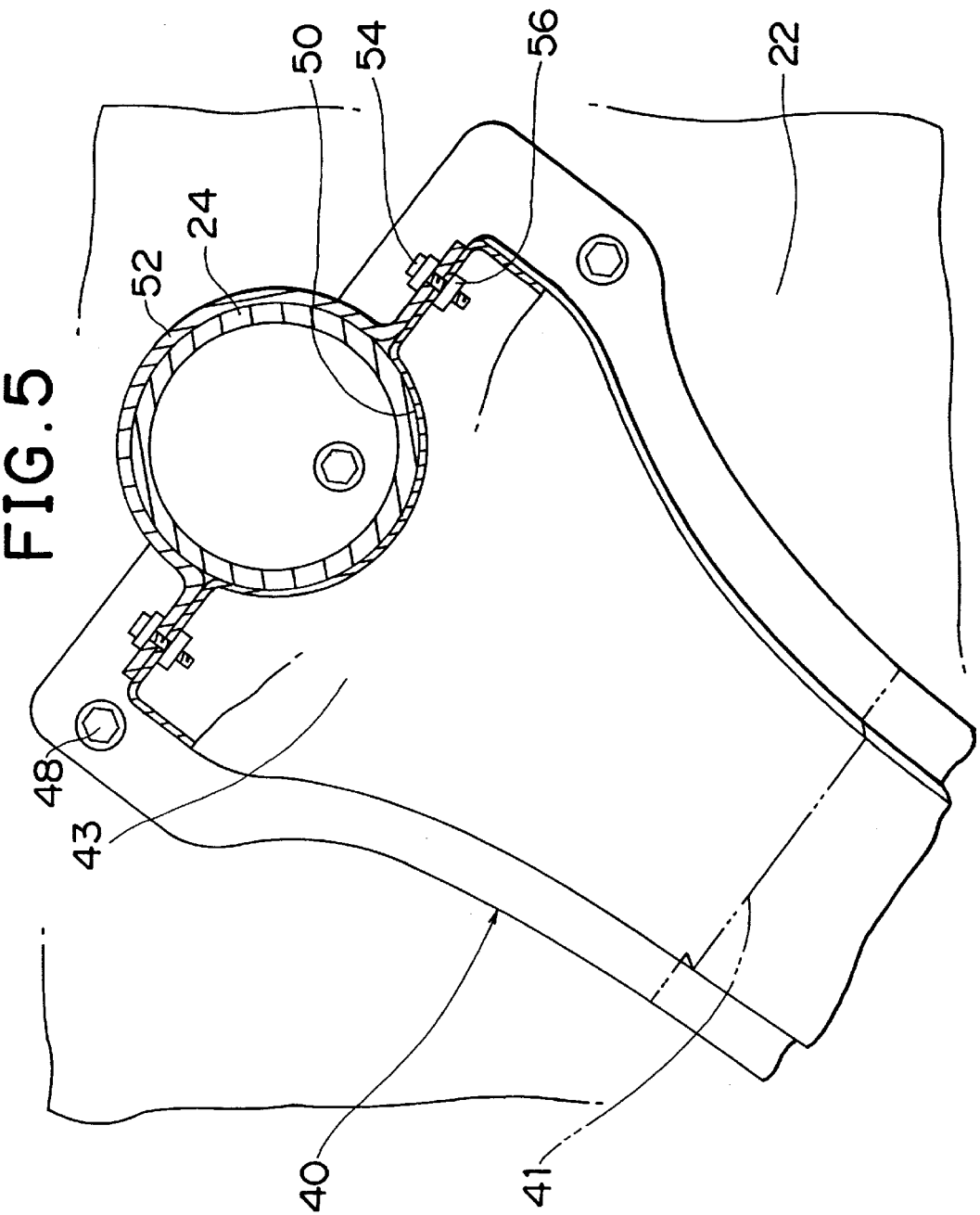
FIG. 5 is a cross sectional view taken along line V—V shown in FIG. 4.
Figure 6:
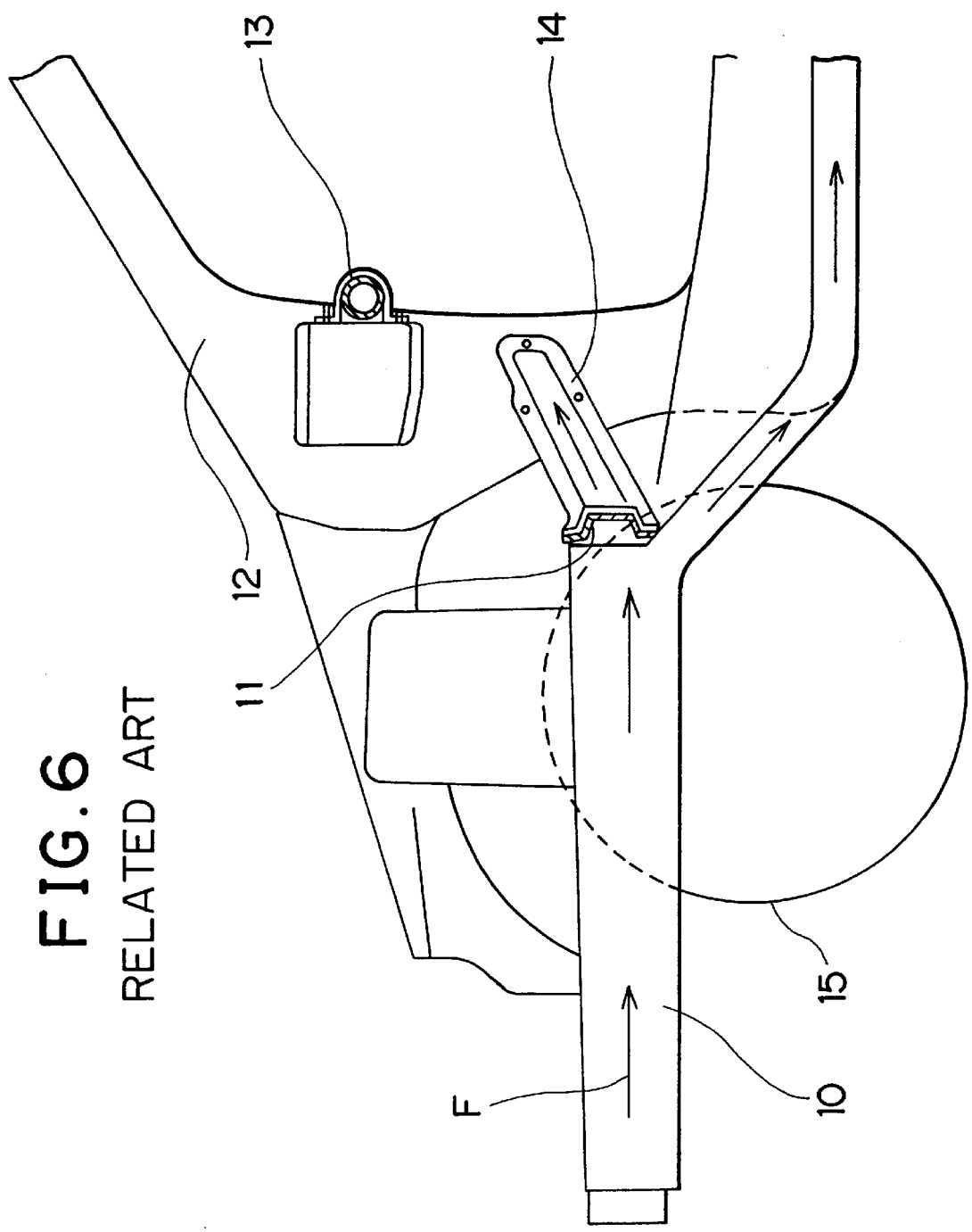
FIG. 6 is a cross sectional view similar to FIG. 1, showing the structure of the front portion of a vehicle body of an automobile.

In this embodiment shown in FIG. 4 which is a perspective view and FIG. 5 which is a cross sectional view, another end 43 of the pillar brace 40 has through holes into which bolts 48 are inserted. The bolts 48 are screwed in nuts (not shown) welded to the front pillar 22, followed by tightening of the bolts 48. Thus, the end 43 is connected to the front pillar 22. The instrument panel reinforcement 24 is in the form of a cylindrical shape. The end 43 of each of the pillar braces 40 has a recess 50 which fits to the outer peripheral surface of the instrument panel reinforcement 24. The instrument panel reinforcement 24 is received by the recess 50, and then a clamp 52 having a shape which fits to the outer peripheral surface of the instrument panel reinforcement 24 is placed to be brought into contact with the instrument panel reinforcement 24. Moreover, bolts 54 are inserted into the clamp 50 and the end 43. The bolts 54 are inserted into nuts 56 welded onto the inside portion of the end 43, followed by tightening of the bolts 54. Thus, the instrument panel reinforcement 24 is connected to the pillar braces 40.

After connecting the pillar braces 40 to the front side members 20 and the instrument panel reinforcement 24, the dash cross member 28, the two pillar braces 40 and the instrument panel reinforcement 24 constitute a trapezoidal truss in a plan view. If the automobile collision causes a rearward load F to be exerted onto the front side members 20, the load F is partially transmitted to the portions of the front side members 20 which are connected to the pillar braces 40. Additionally, the load F partially transmitted to the front pillars 22 through the pillar braces 40. Moreover, the load F is transmitted rearward along the front side members 20, after which the load F is transmitted to the dash cross member 28. The load transmitted to the front pillars 22 through the pillar braces 40 acts to deform the front pillars 22 to the outside A of the cabin. However, the direct connection of the instrument panel reinforcement 24 to the pillar braces 40 causes the load which deform the front pillars 22 to the outside A of the cabin to act as a tensile load which is exerted on the instrument panel reinforcement 24. As described above, the rearward load F exerted onto the front side members 20 is, as indicated with an arrow, dispersed in the lateral direction, that is, the lateral direction, by the dash cross member 28 and the instrument panel reinforcement 24 in the form of the trapezoidal truss. The load transmitted to the front pillars 22 is dispersed to and borne by the instrument panel reinforcement 24. Moreover, the load is also dispersed to and borne by side sills (rockers) 60 connected to the lower ends of the front pillars 22. FIG. 2 shows a passage provided for the right-hand front side member 20 through which the load is transmitted. In the left-hand front side member 20, the load is substantially transmitted symmetrically.

As shown in FIG. 1, the front side member 20 incorporates the front portion 21a which is substantially straight in a side view and the bent portion 21b. An extension of axial line C of the 21a in the side view and the pillar brace 40 define first angle $\theta_1$.

On the other hand, an extension of axial line C of the front portion 21a in the side view and the bent portion 21b define second angle $\theta_2$.

When the strength of a portion of the vehicle body upward of the axial line C and that of a portion of the vehicle body downward of the axial line C are the same, the relationship wherein approximately $\theta_1 = \theta_2$ enables the load exerted from the front side members 20 to be equally distributed to the upper portion and the lower portion. As a result, the load can be absorbed by the overall body of the vehicle such that deformation occurs uniformly and to substantially the same extent. The first angle $\theta_1$ and the second angle $\theta_2$ are determined as follows: if the strength of the portion of the vehicle body upward of the axial line C is higher than that of the portion downward of the axial line C, the relationship of the first angle $\theta_1 <$ the second angle $\theta_2$ is satisfied. If the strength of the portion of the vehicle body upward of the axial line C is lower than that of the portion downward of the axial line C, the relationship of the first angle $\theta_1 >$ the second angle $\theta_2$ is satisfied. Thus, the load can be absorbed by the overall body of the vehicle such that deformation occurs uniformly to substantially the same extent.

While the invention has been described in connection with what is presently considered to be the most practical and preferred embodiments, it is to be understood that the invention is not to be limited to the disclosed embodiments, but on the contrary, is intended to cover various modifications and equivalent arrangements as will be appreciated by those of skill in the art to which it pertains.

What is claimed is:

1. A front portion structure of an automobile vehicle body comprising:
    a front side member having an intermediate portion configured to be disposed in a side portion of a vehicle body and extending in the longitudinal direction of a vehicle;
    front pillars configured to be disposed in right and left portions of the vehicle body;
    an instrument panel reinforcement disposed between the front pillars, and extending in the lateral direction of the vehicle; and
    a pillar brace connected to the intermediate portion of said front side member disposed in the side portion and to said instrument panel reinforcement.

2. A front portion structure of an automobile vehicle body according to claim 1, wherein said instrument panel reinforcement is connected to said front pillar through said pillar brace.

3. A front portion structure of an automobile vehicle body according to claim 1,
    wherein said front side members including a front portion extending substantially straight in a side view, and a bent portion inclining downwards from said front portion in the side view, and
    wherein said pillar brace is connected to said front side member via a rear portion of said front portion of said front side member.

4. A front portion structure of an automobile vehicle body comprising:

front side members configured to be disposed in right and left side portions of a vehicle body and extending in the longitudinal direction of a vehicle, said front side members defining an intermediate portion;

front pillars configured to be disposed in the right and left portions of the vehicle body;

an instrument panel reinforcement disposed between the front pillars, and extending in the lateral direction of the vehicle; and pillar braces connected to the intermediate portion of said front side members disposed in the right and left side portions and to said instrument panel reinforcement.

5. A front portion structure of an automobile vehicle body according to claim 4, wherein said instrument panel reinforcement is connected to said front pillars through said pillar braces.

6. A front portion structure of an automobile vehicle body according to claim 4, wherein each of said front side members includes a front portion extending substantially straight in a side view and a bent portion inclining downwards from said front portion in the side view, and wherein said pillar braces are connected to said front side members at rear portions of said front portions of said front side members.

7. A front portion structure of an automobile vehicle body according to claim 4 further comprising:

a dash cross member disposed between said right and left front side members and extending in the lateral direction.

8. A front portion structure of an automobile vehicle body according to claim 7, wherein said pillar braces are connected to said dash cross member in each of the right and left side portions.

9. A front portion structure of an automobile vehicle body comprising:

front side members configured to be disposed in right and left side portions of the vehicle body and extending in the longitudinal direction of a vehicle, said front side members each defining an intermediate portion;

front pillars configured to be disposed in each of the right and left side portions of the vehicle body;

an instrument panel reinforcement disposed between the right and left front pillars and extending in the lateral direction;

a dash cross member disposed between said right and left front side members and extending in the lateral direction, said dash member being connected to the intermediate portions of said right and left front side members;

pillar braces connected to said dash cross member and to said instrument panel reinforcement in each of the right and left side portions.

10. A front portion structure of an automobile vehicle body according to claim 9, wherein each of said front side members includes a front portion extending substantially straight in a side view and a bent portion inclining downwards from said front portion in the side view, and wherein said dash cross member is connected to a rear end of the front portion of said front side members and said pillar braces are connected to said dash cross member at the rear end of the front portion of said front side members.

11. A front portion structure of an automobile vehicle body according to claim 9, wherein said dash cross member, said pillar brace and said instrument panel reinforcement form a trapezoidal truss in a plan view.

\* \* \* \* \*